United States Patent
Jones

[11] Patent Number: 6,143,228
[45] Date of Patent: Nov. 7, 2000

[54] METHOD OF MAKING A RESILIENT OUTER COVERING

[75] Inventor: Christopher R. Jones, Oak Lawn, Ill.

[73] Assignee: Andrew Corporation, Addison, Ill.

[21] Appl. No.: 09/191,019

[22] Filed: Nov. 12, 1998

[51] Int. Cl.[7] ............................. B29C 33/42; B29C 53/36
[52] U.S. Cl. ............................. 264/295; 264/318
[58] Field of Search ..................... 264/294, 295, 264/220, 224, 226, 227, 299, 318, 319, 334

[56] References Cited

U.S. PATENT DOCUMENTS

| | | |
|---|---|---|
| 3,052,581 | 9/1962 | Gutknecht . |
| 3,950,481 | 4/1976 | Lange .................................... 264/294 |
| 4,016,640 | 4/1977 | Briggs ..................................... 29/450 |
| 4,134,198 | 1/1979 | Briggs ..................................... 29/450 |
| 4,242,164 | 12/1980 | Skinner . |
| 4,508,278 | 4/1985 | Harris et al. .......................... 264/295 |
| 4,941,232 | 7/1990 | Decker et al. ........................ 16/111 R |
| 5,084,514 | 1/1992 | Szczechura et al. ................... 525/123 |
| 5,097,566 | 3/1992 | Decker et al. ........................ 16/111 R |
| 5,126,093 | 6/1992 | Gelardi et al. .......................... 264/295 |
| 5,176,867 | 1/1993 | Thomas . |
| 5,266,257 | 11/1993 | Kildune . |
| 5,292,474 | 3/1994 | Thomas . |
| 5,304,337 | 4/1994 | Chen et al. . |
| 5,419,014 | 5/1995 | Piantedosi . |
| 5,558,829 | 9/1996 | Petrick . |

*Primary Examiner*—Angela Ortiz
*Attorney, Agent, or Firm*—Vedder, Price, Kaufman & Kammholz

[57] ABSTRACT

A method of forming a continuous band of resilient material with a preselected design on an exterior surface thereof, which has a seamless appearance is disclosed. The method includes inserting a molding insert core having a textured outer surface within a molding cavity. A continuous band of resilient material is formed about the core. The band bears the reverse image of the textured pattern on its interior surface. Like other molding processes, the band bears flash or parting lines formed on its exterior surface. The band is inverted by turning it inside out so that the flash or parting lines are positioned on its interior surface and the reverse of the textured pattern is positioned on its exterior surface. As such, an aesthetically pleasing band having a seamless exterior surface is produced.

14 Claims, 3 Drawing Sheets

METHOD OF MAKING A RESILIENT OUTER COVERING

BACKGROUND OF THE INVENTION

The present invention relates generally to a method of making a flexible or resilient band, and more particularly to a method of molding a continuous band of flexible or resilient material whereby the band has a seamless exterior surface.

The present invention finds particular utility in the manufacture of textured coverings for cigarette lighter adapters used by cellular telephones and the like by providing a seamless, but textured exterior surface to the adapter.

The prior art describes a number of molding techniques for manufacturing resilient outer coverings having parting or flash lines on their exterior surface. Flash lines are formed between the parting lines of two opposing mold blocks and are formed during the manufacturing process. Flash lines are cosmetically unattractive and it is desirable to eliminate them, or at least obstruct them from view. The present invention is directed to a method of making a resilient outer covering or sleeve having a seamless exterior surface.

In conventional injection molding techniques, it is typically required to remove and replace the mold blocks of the molding assembly when it is desired to change the textured design to be formed on the exterior surface of the manufactured product. The textured design might identify the maker of the end product. To change the design using conventional molding processes, the manufacturer must typically stop the molding process and insert new mold blocks and/or inserts. This is time consuming and costly, both in labor and in terms of cost of mold blocks and/or inserts.

SUMMARY OF THE INVENTION

The present invention overcomes these disadvantages by forming the textured design with a mold core much like those typically included in molding assemblies which are used to manufacture bands, but which has a textured outer surface. In this regard, the mold core has a textured pattern on its outer surface that corresponds to the desired design. To change the desired design while practicing the present invention, the manufacturer need only remove the existing mold core from the molding assembly and replace it with another one having a textured pattern on its outer surface which corresponds to the desired design. Replacement of the mold core with the present invention is quicker, easier and less expensive than replacement of the traditional mold blocks used in conventional mold techniques. As a result, the manufacturing process is more efficient and less costly.

Accordingly, it is an object of the present invention to provide a method of making a textured, resilient, outer covering member.

It is another object of the present invention to provide a method of making a continuous, resilient outer covering for a cigarette lighter adapter having a seamless exterior surface.

It is still another object of the present invention to provide a method of making a resilient outer covering member in the form of a sleeve with a molding assembly which allows a textured design to be placed on the exterior surface of an end product, and permits the design formed thereon to be readily changed during molding, thereby providing a more efficient manufacturing process.

It is yet another object of the present invention to provide a molding assembly for molding a resilient outer covering member in the form of a sleeve wherein the molding assembly is made up of fewer parts than those previously required to form a design around a substantial portion of the circumference of the sleeve during the molding process.

The present invention is directed to a method of forming a continuous, resilient outer covering having a seamless exterior surface without visible parting lines. To carry out this method, the manner of molding is inverted. A mold core having a textured pattern formed on its outer surface in the form of a reverse image for the final product design is provided for insertion into a mold cavity. A continuous, resilient outer covering is formed about the core like conventional molding processes, but the covering has the reverse image of the textured pattern formed on its interior surface, as opposed to its exterior surface. Parting lines and flash may be formed where the mold blocks lie adjacent each other around the mold core, but these lines and flash are formed on the ultimate interior surface of the covering. The covering is then turned inside out (inverted) so that the flash and parting lines are positioned on its interior surface, away from view. The textured pattern formed on the mold core is thereby positioned on its exterior surface to provide for the display thereof.

These and other objects, features and advantages of the present invention will be apparent from the following detailed description, taken in conjunction with the accompanying drawings, wherein like reference numerals refer to like parts.

BRIEF DESCRIPTION OF THE DRAWINGS

In the course of this detailed description, reference will be made to the accompanying drawings in which.

DETAILED DESCRIPTION OF THE INVENTION

Figure 5:
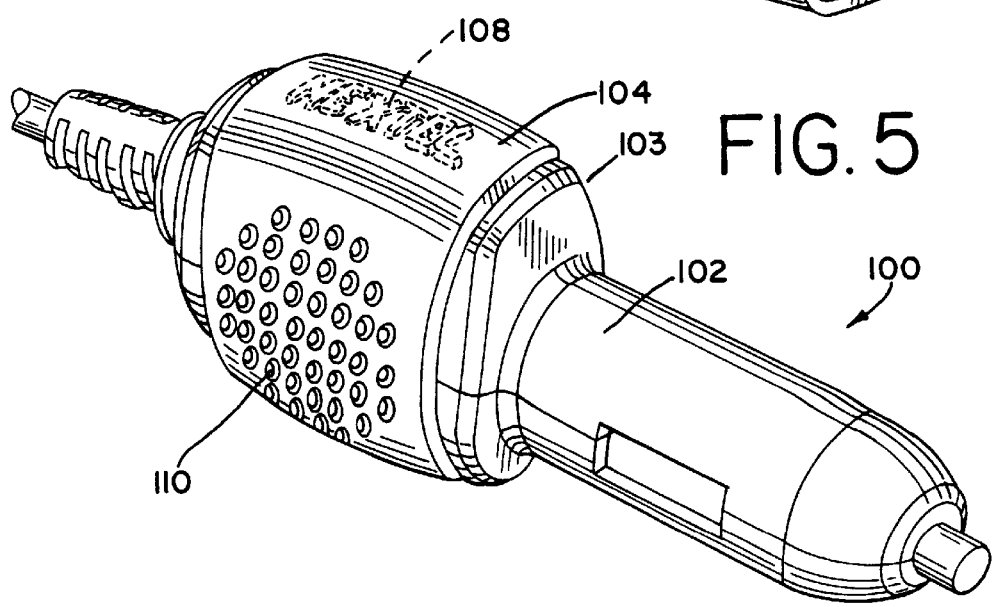

FIG. 5 illustrates a cigarette lighter adapter 100 that is insertable into a cigarette lighter socket of a vehicle to draw power from the vehicle for use by an electronic device, such as a cellular telephone. The adapter 100 has a plastic housing 102 that encloses the relevant components thereof. Housing 102 may be comprised of two interconnected sections, as shown. Cigarette lighter adapter 100 is preferably of the type described and shown in pending U.S. Ser. No. 09/015,681, filed Jan. 29, 1998, the disclosure of which is hereby incorporated herein by reference.

Figure 4:
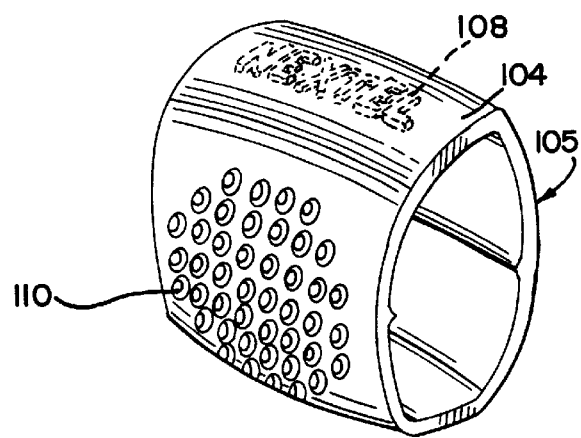
FIG. 4 is a perspective view of a cigarette lighter adapter grip outer covering made in accordance with the manufacturing process of the present invention; and, FIG. 5 is a perspective view of a cigarette lighter adapter having the cigarette lighter adapter grip cover of FIG. 4 disposed thereon.

Cigarette lighter adapter 100 includes a separate exterior cover 104 which, as described in further detail below, is preferably made in accordance with the principles of the present invention. As illustrated in FIG. 4, cover 104 is preferably formed as a continuous sleeve 105 and also preferably has an overall diameter that is slightly less than the overall diameter of the portion of adapter housing 102 about which it is disposed. As a result, cover 104 snugly secures to adapter housing 102 and may assist in retaining the two sections of housing 102 together.

Cover 104 may include textured portions arranged to form a design, such as lettering 108 and/or raised portions 110, or any other desired design. The raised portions 110 facilitate the gripping of the cigarette lighter adapter 100 by a user when inserting or removing the same from its corresponding cigarette lighter socket. Lettering 108 may be used to identify the source, or manufacturer, from which the cigarette lighter adapter emanates.

Cover 104 may be formed from a flexible or resilient material, such as rubber, an elastomer or a soft plastic. The circuitry contained within adapter housing 102 inevitably dissipates energy in the form of heat during operation and, in this regard, cover 104 may provide an insulating layer for the adapter. Depending on the softness of the material used, the cover 104 also provides a soft exterior surface that may be gripped by the user regardless of the surrounding temperature. As mentioned above, the flexible cover 104 has a slightly smaller overall diameter than the main body portion 103 of the cigarette lighter adapter housing 102, and the cover 104 overlies and is disposed about and snugly secured to that portion 103 of the adapter housing.

Cover 104 may be manufactured through the practice of a variety of manufacturing techniques, but is most preferably manufactured in accordance with the principles of the present invention. Unlike the present invention, and as mentioned above, the practice of conventional molding techniques results in a product having flash and parting lines on its exterior surface.

Figure 1:
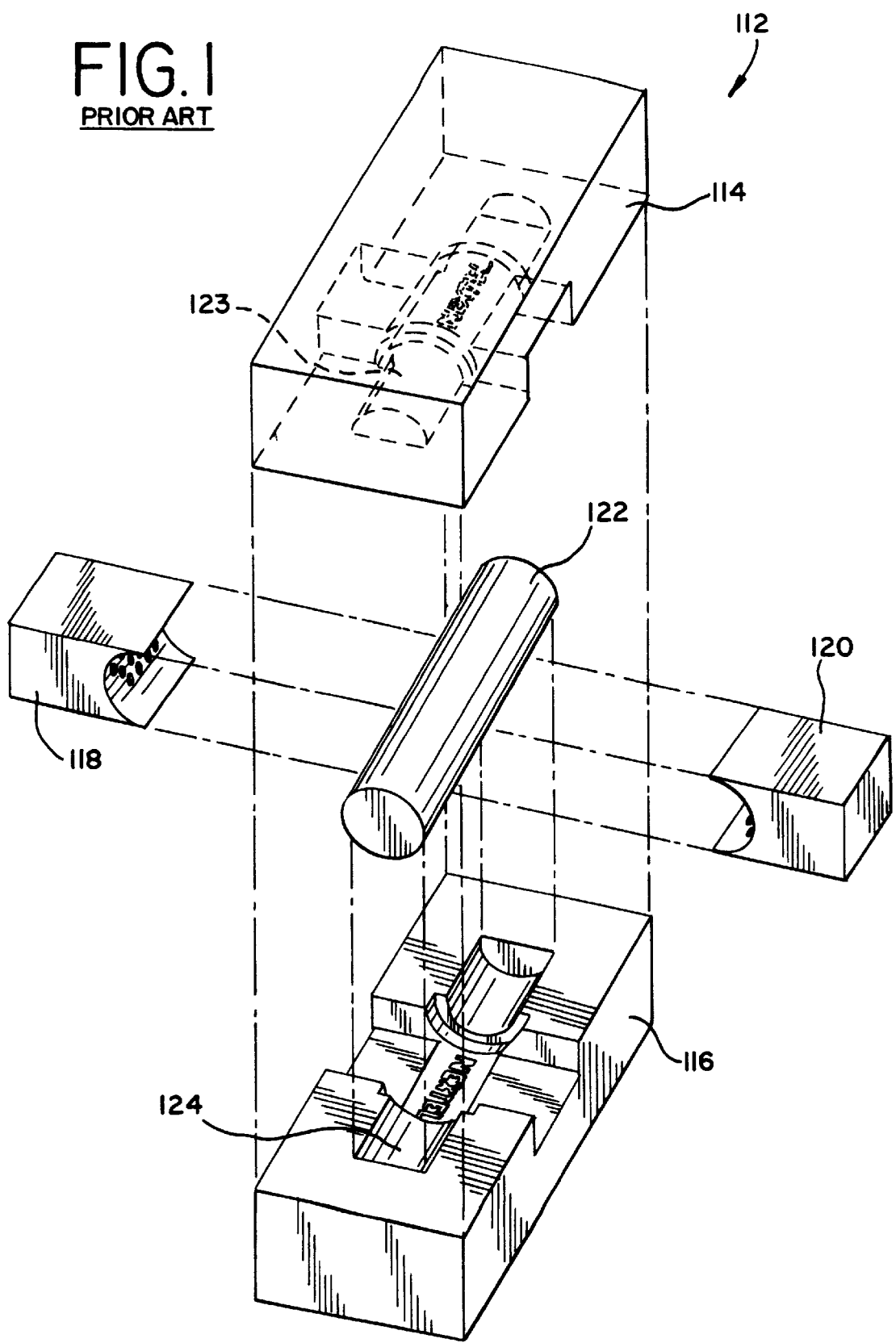
FIG. 1 is an exploded perspective view of a molding assembly used in conventional molding processes.

FIG. 1 illustrates a mold assembly 112 of the type typically used to manufacture band-shaped plastic sleeves and the like via conventional molding techniques. The mold assembly 112 can be seen to include a pair of opposing mold blocks 114, 116, each of which has an associated cavity 123, 124 formed therein and a pair of side mold blocks or inserts 118, 120 associated therewith having additional details of the design(s) formed on outer cover 104, which are provided for insertion into corresponding recesses of mold blocks 114, 116. A central insert 122 may be provided for insertion into cavities 123, 124 of the mold blocks 114, 116. Insert 122 forms a base or core upon which the outer covering 104 is molded.

As shown, blocks 114, 116 and side blocks 118, 120 all include patterns corresponding to the desired design to be formed on the exterior surface of the covering 104 during the molding process. Mold blocks 114, 116 each include cavities 123, 124, respectively, which accommodate the core 122 when it is placed within the mold cavity defined by blocks 114, 116 and side blocks 118, 120 when they are brought together during molding. As shown, the outer surface of the conventional mold core 122 is typically untextured, and is smooth. After placing the core within the mold cavity and closing the molding assembly 112 so that the blocks 114, 116 and the side blocks 118, 120 are brought together, the molding process may begin and a product of resilient material can thereby be formed. The interior surface of the so-formed product is smooth, i.e., the configuration of the mold core insert, while the product's exterior surface takes on the form of the reverse image of the pattern included within the cavities 123, 124 of the mold blocks 114, 116 and side blocks 118, 120. As such, the interior surface of the product is untextured, while its exterior surface is textured in accordance with the patterns on the blocks and side blocks. After molding, the mold core insert 122 is removed from the mold cavity and the product is removed from the cavity so that it may be disposed about and secured to portion 103 of the cigarette lighter adapter housing 102, as shown in FIG. 5.

In order to change the desired design to be formed on the exterior surface of the grip cover 104 made during the molding process, with conventional molding techniques, it is necessary to replace blocks 114, 116, 118, and 120 with similar blocks having patterns corresponding to the desired design. As described above, this is costly and time consuming. Further, any flash and/or parting lines formed at the junctures between the molding blocks 114, 116 and side blocks 118, 120 will remain on the exterior surface of the grip cover 104 and be within easy view when the product is in use, such as when it is disposed about the cigarette lighter adapter housing 102. The flash and parting lines diminish the aesthetic appeal of the manufactured product. They must be removed manually after molding which requires increased labor, thereby also increasing the final cost of the product.

Figure 2:
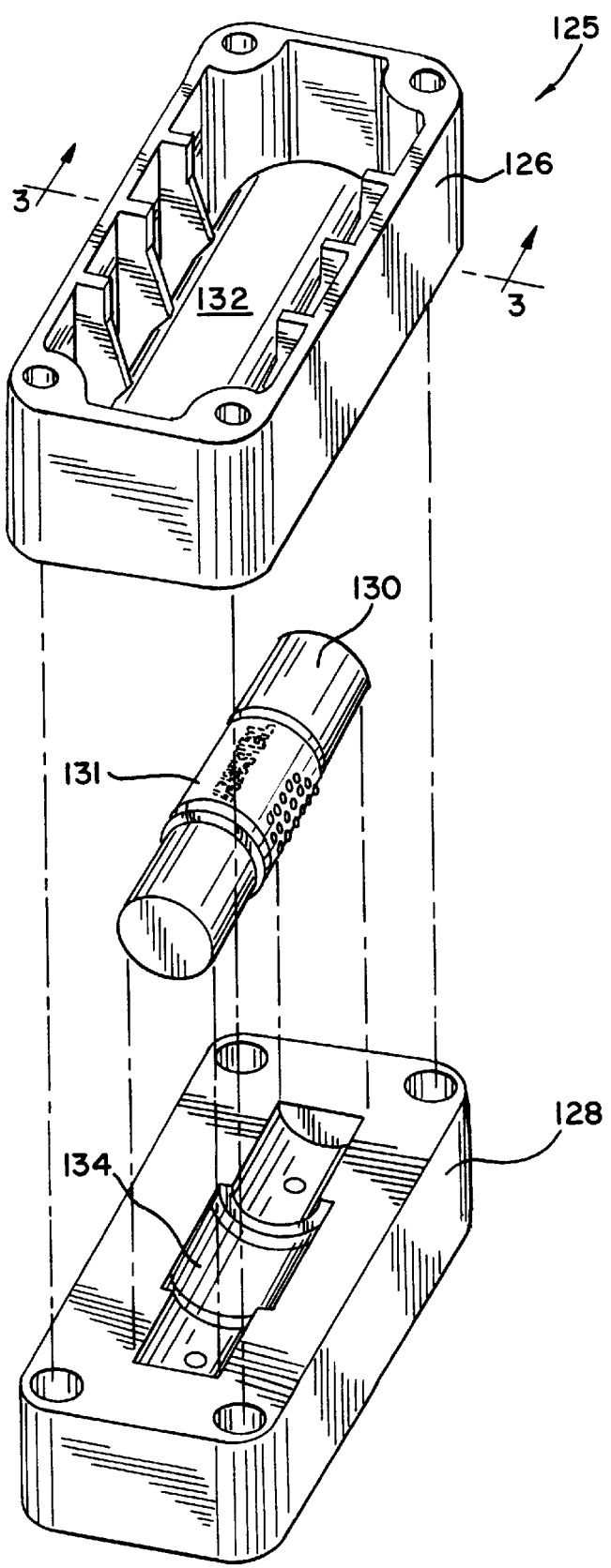
FIG. 2 is an exploded perspective view of a molding assembly used to carry out the manufacturing process of the present invention.

FIG. 2 illustrates a molding assembly 125 which may be used to practice the molding process of the present invention. The molding assembly 125 includes two mold blocks 126, 128 and a textured mold core insert 130. Core insert 130 has a textured outer surface 131. Each mold block 126, 128 includes a cavity 132, 134, that cooperatively define a mold cavity when the mold blocks are brought together. The textured core insert 130 is positioned within this cavity during molding. A continuous band of resilient material is formed similar to the way it would be if a conventional molding technique were used. However, in this case, the textured design is formed on the interior surface of the formed product due to the textured outer surface 131. Any flash and parting lines formed during this manufacturing process appear on its exterior surface, as formed. But, after the molding process is completed, the core insert 130 is removed from the molding cavity and the product is removed from the core insert. Thereafter, the product is turned inside out so that its interior surface, as formed, becomes its exterior surface and its exterior surface, as formed, becomes its interior surface. Accordingly, a product is formed whereby, when in use, its interior surface has any and all flash and parting lines formed during the molding process and its exterior surface bears the desired design.

In order to change or alter the desired design to be formed on the exterior surface of the finished product, it is only necessary to replace the core insert 130 used with the molding assembly 125 of the present invention. A core insert 130 having a textured outer surface 131 corresponding to the desired design would be used. This may be accomplished quickly and easily, rendering practice of the present invention less expensive and more efficient than conventional techniques.

Figure 3:
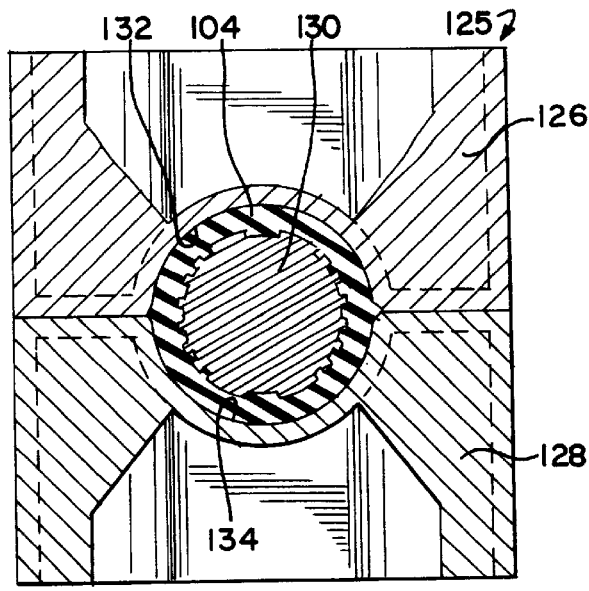
FIG. 3 is a sectional view of the molding assembly of FIG. 2 taken along line 3—3 thereof.

FIG. 3 illustrates a sectional view of the molding assembly 125 used to practice the present invention. As shown, the surfaces of the mold cavity defined by the two mold cavities 132, 134 of the molding blocks 126, 128, respectively, is generally untextured. Any textured pattern corresponding to the desired design to be formed on the exterior surface of the finished product is included on the outer surface 131 of the core insert 130 used with the molding assembly 125. After the product is pulled off the core insert 130 after completion of the molding process, the product is simply inverted (i.e., turned inside out) so that the textured design is positioned on its exterior surface and any and all flash and parting lines which were formed during the molding process are positioned on its interior surface. Accordingly, a band having a seamless exterior surface is produced and an aesthetically pleasing product is provided.

It will be understood that the embodiment of the present invention which has been described herein is merely illustrative of some of the applications of the principles of the present invention. Various modifications may be made by those skilled in the art without departing from the true spirit and scope of the invention.

What is claimed:

1. A method of forming an outer cover for a cigarette lighter adapter from a continuous resilient material with a preselected design on an exterior surface thereof, the exterior surface of the cigarette lighter adapter outer cover having a seamless appearance but for the preselected design, comprising the steps of:

provinding a first mold block with a first cavity formed therein and adapted to receive a molding insert therein in a predetermined position;

providing a molding insert having a textured pattern formed on its outer surface, the textured pattern being a reverse image of said preselected design;

inserting said molding insert into said mold block cavity;

forming a continuous outer cover by depositing a curable, liquid resilient material into said mold block cavity about said molding insert;

permitting the curable liquid resilient material to cure to form the outer cover extending around said molding insert; said outer cover having the reverse image of said textured pattern formed an interior surface thereof facing said molding insert;

inverting said outer cover by turning it inside out so that said textured pattern is positioned on said exterior surface of said outer cover; and applying said outer cover to the exterior surface of a cigarette lighter adapter housing.

2. The method of claim 1, wherein said molding insert includes an elongated, cylindrical member.

3. The method of claim 1 further comprising the step of providing a second mold block having a second cavity formed therein, bringing said first and second mold blocks together so that said first and second cavities are aligned together to cooperatively form a major cavity between said first and second mold blocks, said second mold block also being adapted to receive a portion of said molding insert therein in said predetermined position.

4. The method of claim 3, wherein said molding insert is received lengthwise in said major cavity.

5. The method of claim 1, wherein said curable liquid resilient material is injected into said first cavity under pressure.

6. The method of claim 1, wherein said molding insert is formed as a single piece with a seamless outer surface.

7. A method of forming a continuous band of resilient material with a preselected design on an exterior surface thereof, the exterior surface having a seamless appearance but for the preselected design, comprising the steps of:

providing a first mold block with a first cavity formed therein and adapted to receive a molding insert therein in a predetermined position;

providing a second mold block with a second cavity formed therein and adapted to receive said molding insert therein in said predetermined position;

providing a molding insert having a textured pattern formed on its outer surface, the textured pattern being a reverse image of said preselected design;

inserting said molding insert into a primary mold block cavity cooperatively formed by said first and second cavities;

forming a continuous band by injecting resilient material into said primary cavity about said molding insert and permitting said resilient material to solidify so that said band has the reverse image of said textured pattern formed on its interior surface and further has a flash line formed on its exterior surface when said band is in its as-formed configuration;

inverting said band by turning it inside out so that said flash line is positioned on the interior surface of said band and the reverse of said textured pattern is positioned on the exterior surface of said band;

providing a cigarette lighter adapter having a housing; and disposing said band about said housing.

8. The method of claim 7, wherein said band is disposed about said housing after it is inverted.

9. The method of claim 7, wherein said molding insert includes an elongated, cylindrical member.

10. The method of claim 7, wherein said first and second cavities support said molding insert in a lengthwise position.

11. A method of forming a resilient outer cover with a preselected design on an exterior surface thereof, the exterior surface having a seamless appearance but for the preselected design, comprising the steps of:

providing a first mold block with a first cavity formed therein and adapted to receive a molding insert therein in a predetermined position;

providing a second mold block with a second cavity formed therein and adapted to receive said molding insert therein in said predetermined position;

inserting said molding insert into a mold block cavity formed by said first and second cavities;

combining said first and second mold blocks together to enclose said molding insert in said first and second cavities;

forming said cover by injecting a liquid of resilient material into said mold block cavity about said molding insert so that said cover has the reverse image of said textured pattern formed on its interior surface and further has a flash line formed on its exterior surface when said cover is in its as formed configuration;

inverting said cover by turning it inside out so that said flash line is positioned on the interior surface of said cover and the reverse of said textured pattern is positioned on the exterior surface of said cover;

providing a cigarette lighter adapter having a housing; and, disposing said cover about said housing.

12. The method of claim 11, wherein said cover is disposed about said housing after it is inverted.

13. The method of claim 11, wherein said molding insert includes an elongated, solid cylindrical member.

14. The method of claim 11, wherein said first and second cavities support said molding insert in a lengthwise position.

* * * * *